(12) United States Patent
Monroe et al.

(10) Patent No.: US 11,931,806 B2
(45) Date of Patent: Mar. 19, 2024

(54) POWDER BASED 3D PRINTING

(71) Applicant: Hewlett-Packard Development Company, L.P., Spring, TX (US)

(72) Inventors: Michael Gabriel Monroe, Corvallis, OR (US); Pedro Ros Zuazua, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 256 days.

(21) Appl. No.: 15/734,584

(22) PCT Filed: Jan. 29, 2019

(86) PCT No.: PCT/US2019/015555
§ 371 (c)(1),
(2) Date: Dec. 3, 2020

(87) PCT Pub. No.: WO2020/159476
PCT Pub. Date: Aug. 6, 2020

(65) Prior Publication Data
US 2021/0346960 A1    Nov. 11, 2021

(51) Int. Cl.
*B22F 10/50* (2021.01)
*B22F 10/14* (2021.01)
(Continued)

(52) U.S. Cl.
CPC .............. *B22F 10/50* (2021.01); *B22F 10/14* (2021.01); *B22F 10/38* (2021.01); *B22F 12/30* (2021.01);
(Continued)

(58) Field of Classification Search
CPC .......... B22F 10/50; B22F 10/14; B22F 10/38; B22F 10/32; B22F 10/322; B22F 12/30;
(Continued)

(56) References Cited

U.S. PATENT DOCUMENTS 7,435,368 B2   10/2008  Davidson et al.
9,533,452 B2    1/2017  Guenster et al.
(Continued)

FOREIGN PATENT DOCUMENTS

| WO | WO-2007039450 A1 | 4/2007 |
| WO | WO-2018014898 A1 | 1/2018 |
| WO | WO-2018173048 A1 | 9/2018 |

OTHER PUBLICATIONS

Zocca Andrea et al., Powder-Bed Stabilization for Powder-Based Additive Manufacturing, Jun. 16, 2014, Journals.

*Primary Examiner* — Nahida Sultana
*Assistant Examiner* — Lawrence D. Hohenbrink, Jr.
(74) *Attorney, Agent, or Firm* — Shook, Hardy & Bacon L.L.P.

(57) ABSTRACT

In one example, a memory having instructions thereon that when executed cause a 3D printing system to repeatedly form each of multiple successive layers of powdered build material on a platform and apply a functional agent to build material in each layer, create a pressure difference across a thickness of build material on the platform, and increase the pressure difference over an extent of build material on the platform as the build material on the platform gets thicker.

12 Claims, 8 Drawing Sheets

(51) Int. Cl.
*B22F 10/38* (2021.01)
*B22F 12/30* (2021.01)
*B22F 12/63* (2021.01)
*B29C 64/165* (2017.01)
*B29C 64/245* (2017.01)
*B29C 64/393* (2017.01)
*B33Y 10/00* (2015.01)
*B33Y 30/00* (2015.01)
*B33Y 50/02* (2015.01)
*B22F 10/32* (2021.01)
*B22F 10/322* (2021.01)
*B22F 12/70* (2021.01)

(52) U.S. Cl.
CPC ............ *B22F 12/63* (2021.01); *B29C 64/165* (2017.08); *B29C 64/245* (2017.08); *B29C 64/393* (2017.08); *B33Y 10/00* (2014.12); *B33Y 30/00* (2014.12); *B33Y 50/02* (2014.12); *B22F 10/32* (2021.01); *B22F 10/322* (2021.01); *B22F 12/70* (2021.01)

(58) Field of Classification Search
CPC .......... B22F 12/63; B22F 12/70; B33Y 30/00; B33Y 50/02; B33Y 10/00; B29C 64/245; B29C 64/393; B29C 64/165
USPC ........................................................ 425/78
See application file for complete search history.

(56) References Cited

U.S. PATENT DOCUMENTS

| | | | |
|---|---|---|---|
| 10,071,546 B2 | 9/2018 | Bredemeyer et al. | |
| 2001/0045678 A1 | 11/2001 | Kubo et al. | |
| 2004/0084814 A1* | 5/2004 | Boyd | B29C 64/35 |
| | | | 264/109 |
| 2015/0246485 A1* | 9/2015 | Guenster | B29C 64/40 |
| | | | 264/511 |
| 2016/0052054 A1 | 2/2016 | Orange et al. | |
| 2016/0158843 A1 | 6/2016 | Yolton et al. | |
| 2018/0015670 A1 | 1/2018 | Gu et al. | |
| 2018/0186069 A1* | 7/2018 | Oppenheimer | B29C 64/205 |

* cited by examiner

┌─────────────────────────────────────────────────────────┐
│ REPEATEDLY FORMING EACH OF MULTIPLE                     │
│ SUCCESSIVE LAYERS OF POWDERED BUILD MATERIAL            │
│ ON A PLATFORM AND APPLYING A FUNCTIONAL AGENT           │
102 ─ │ TO BUILD MATERIAL IN EACH LAYER                         │
└─────────────────────────────────────────────────────────┘
                             │
┌─────────────────────────────────────────────────────────┐
│ COMPRESSING BUILD MATERIAL ON THE PLATFORM              │
│ CONTINUOUSLY WHILE FORMING THE LAYERS AND               │
104 ─ │ APPLYING THE AGENT                                      │
└─────────────────────────────────────────────────────────┘
```

┌─────────────────────────────────────────────────────────┐
│ REPEATEDLY FORMING EACH OF MULTIPLE                     │
│ SUCCESSIVE LAYERS OF POWDERED BUILD MATERIAL            │
│ ON A PLATFORM AND APPLYING A FUNCTIONAL AGENT           │
112 ─ │ TO BUILD MATERIAL IN EACH LAYER                         │
└─────────────────────────────────────────────────────────┘
                             │
┌─────────────────────────────────────────────────────────┐
│ SIMULTANEOUSLY HEATING AND COMPRESSING BUILD            │
│ MATERIAL ON THE PLATFORM WHILE FORMING EACH             │
114 ─ │ LAYER                                                   │
└─────────────────────────────────────────────────────────┘
```

FIG. 11

POWDER BASED 3D PRINTING

BACKGROUND 3D printers convert a digital representation of an object into a physical object. 3D printing includes any of various processes in which material is bound or solidified under computer control to create a three-dimensional object. 3D printing is also commonly referred to as additive manufacturing. 3D printers are often used to manufacture objects with complex geometries using materials such as thermoplastics, polymers, ceramics and metals. In powder based 3D printing, successive layers of a powdered build material are formed and portions of each layer bound or fused in a desired pattern to build up the object.

DRAWINGS

FIGS. 6-9 illustrate an example build platform with multiple vacuum zones to apply vacuum selectively during the printing process.

The same part numbers designate the same or similar parts throughout the figures. The figures are not necessarily to scale.

DESCRIPTION

Metal objects may be printed by selectively applying a liquid binder to portions of each of successive layers of metal powder corresponding to a solid layer of the 3D object. The binder is cured, for example using heat and/or ultra violet light, to hold the metal powder particles together in the desired shape. The cured object, known commonly as a "green part", is heated in a sintering furnace to burn off any residual binder and sinter the metal particles. Polymer objects may be printed by selectively applying a liquid energy absorbing fusing agent to portions of each of successively layers of polymer powder and exposing the treated powder in each layer to light, heat and/or other electromagnetic radiation, causing the treated powder to fuse as part of the printing process.

It may be desirable in some powder based 3D printing processes to compress the build material powder during printing. The increased density of the compressed powder helps strengthen the printed object, particularly for green parts in which the build material is not yet fused. Build material powder may be compressed by sucking the powder down against the build platform. A new technique has been developed to help improve vacuum compression in powder based 3D printing. In an example, vacuum is applied to compress the build material powder continuously while forming the layers of build material powder and applying binder or fusing agents on to powder in each layer. In an example, vacuum is applied selectively through multiple zones at different times during the printing process, and at varying intensities to help maintain uniform compression across the full extent of the build area of the platform even as the thickness of the build material increases.

These and other examples described below and shown in the figures illustrate but do not limit the scope of the patent which is defined in the Claims following this Description.

As used in this document, "and/or" means one or more of the connected things; a "functional agent" means a binder and/or a fusing agent; and a "memory" means any non-transitory tangible medium that can embody, contain, store, or maintain information and instructions for use by a processor.

Figure 1:
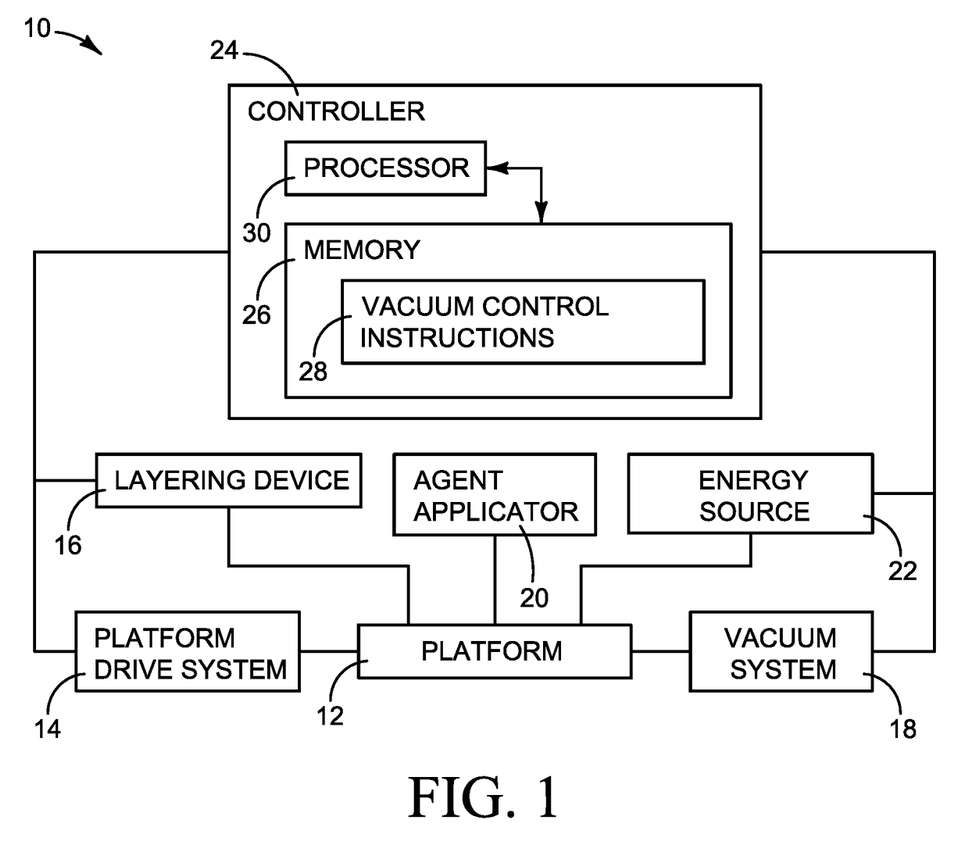
FIG. 1 is a block diagram illustrating a 3D printer implementing an example vacuum system and controller to selectively compress build material powder during printing.

FIG. 1 is a block diagram illustrating a 3D printer implementing one example of a vacuum system and controller to selectively compress build material powder during printing. Referring to FIG. 1, a 3D printer 10 includes a platform 12 to support build material during printing, a drive system 14 to lower platform 12 incrementally to accommodate a succession of layers of build material, a layering device 16 to layer build material on to platform 12, a vacuum system 18 to apply a vacuum to build material on platform 12, and an applicator 20 to selectively apply a functional agent to build material on platform 12. Printer 10 may also include an energy source 22 to apply heat, light or other electromagnetic radiation to cure or fuse build material treated with a functional agent.

Printer 10 also includes a controller 24 with the processing and memory resources, programming, and the electronic circuitry and components needed to control the operative components of machine 10. Controller 24 may include distinct control elements for individual printer components. In particular, controller 24 includes a memory 26 with vacuum control instructions 28 and a processor 30 to execute instructions 28 to apply the desired vacuum to build material powder on platform 12. Processor 30 executing instructions 28 controls vacuum system 18 to apply vacuum selectively at locations and intensities to achieve the desired compression as build material is layered on platform 12.

Figure 2:
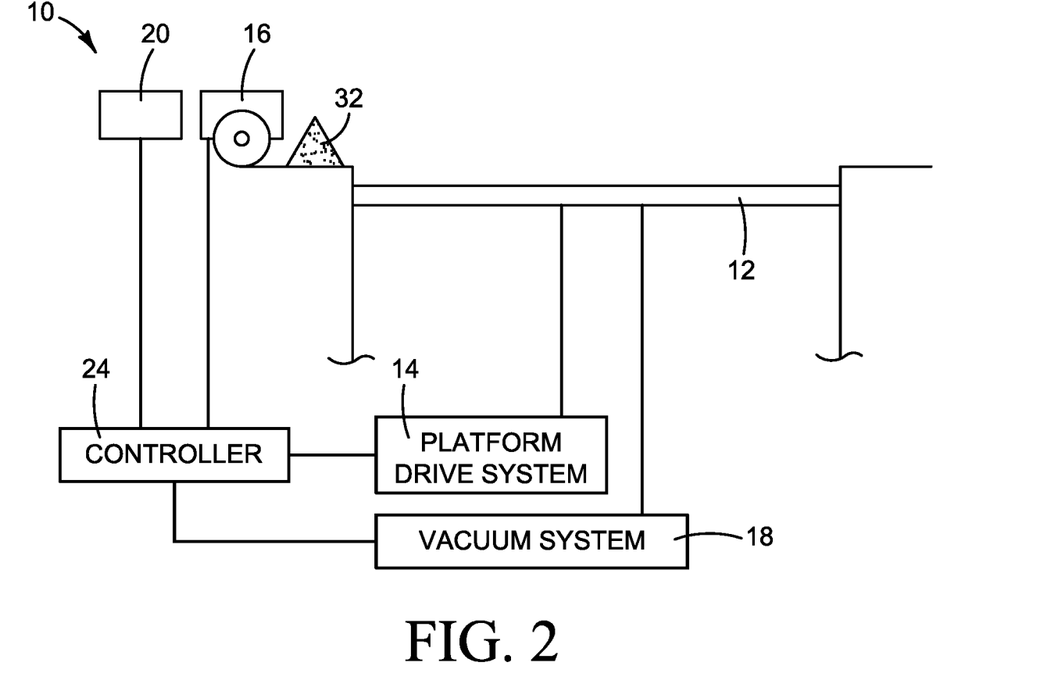
FIGS. 2-5 present a sequence of views showing an example process for a 3D printer using vacuum powder compression.

FIGS. 2-5 present a sequence of views showing one example of a process for a 3D printer 10 using vacuum compression. Controller 24 is omitted from FIGS. 3 and 4. Referring to FIG. 2, printer 10 includes build platform 12, platform drive 14, layering roller 16, vacuum system 18, agent applicator 20 and controller 24. A pile of powdered build material 32 is staged next to platform 12 in preparation for the next layer. Roller 16 and applicator 20 are moved back and forth over platform 12 at the direction of controller 24. Although not shown in FIGS. 2-5, printer 10 may also include an energy source 22 from FIG. 1 to fuse or cure build material on platform 12 treated with a functional agent.

Figure 3:
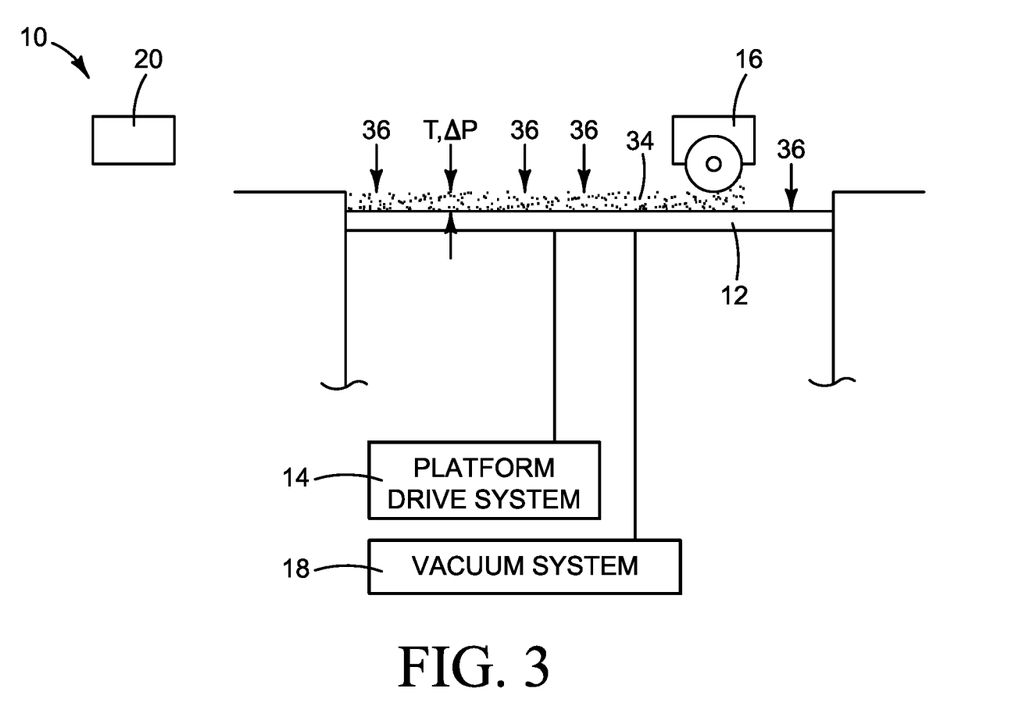

In FIG. 3, roller 16 is moving to the right spreading build material over platform 12 in a first layer 34. Vacuum system 18, operating at the direction of controller 24, creates a low pressure region along platform 12. The resulting pressure difference ΔP across the thickness T of build material layer 34 generates air flow through the build material as indicated by flow arrows 36. The air flow compresses build material in layer 34.

In this example, the region above platform 12 is exposed to atmospheric pressure and, therefore, vacuum system 18 may be said to "pull" air through the build material. It may be desirable in some implementations to pressurize the build chamber over platform 12 to "push" air through build material 32, instead of or in addition to pulling air through the build material with vacuum. Usually it will cost less to pull air through the build material with negative pressure (i.e., vacuum) compared to pushing air through with positive pressure.

Figure 4:
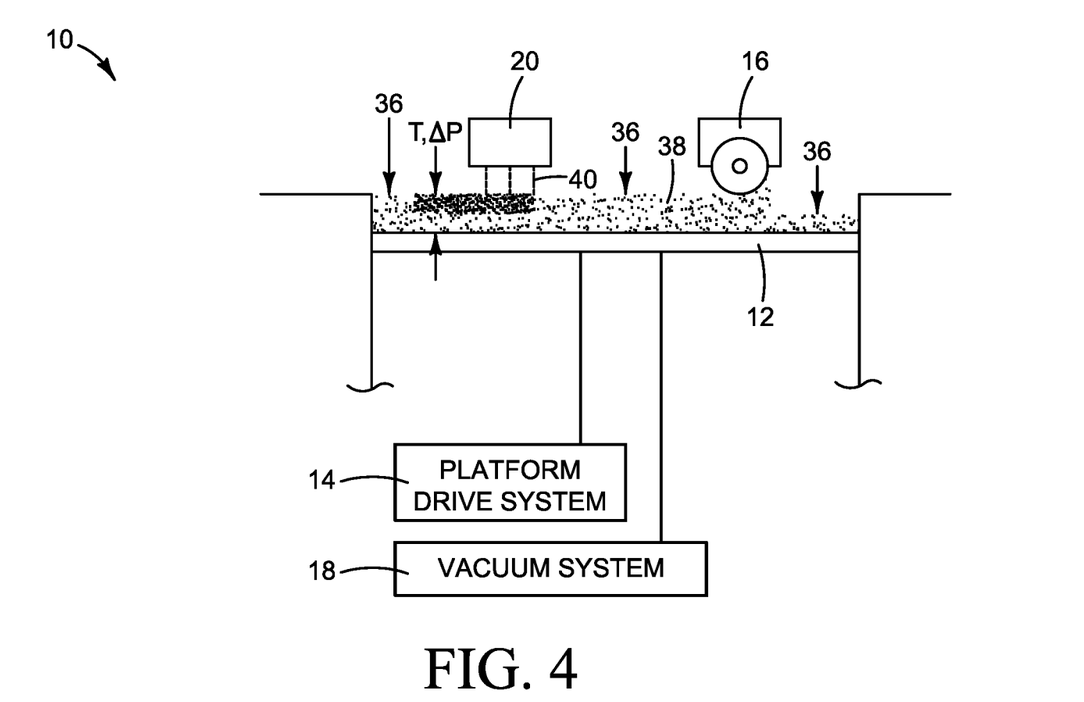
Figure 5:
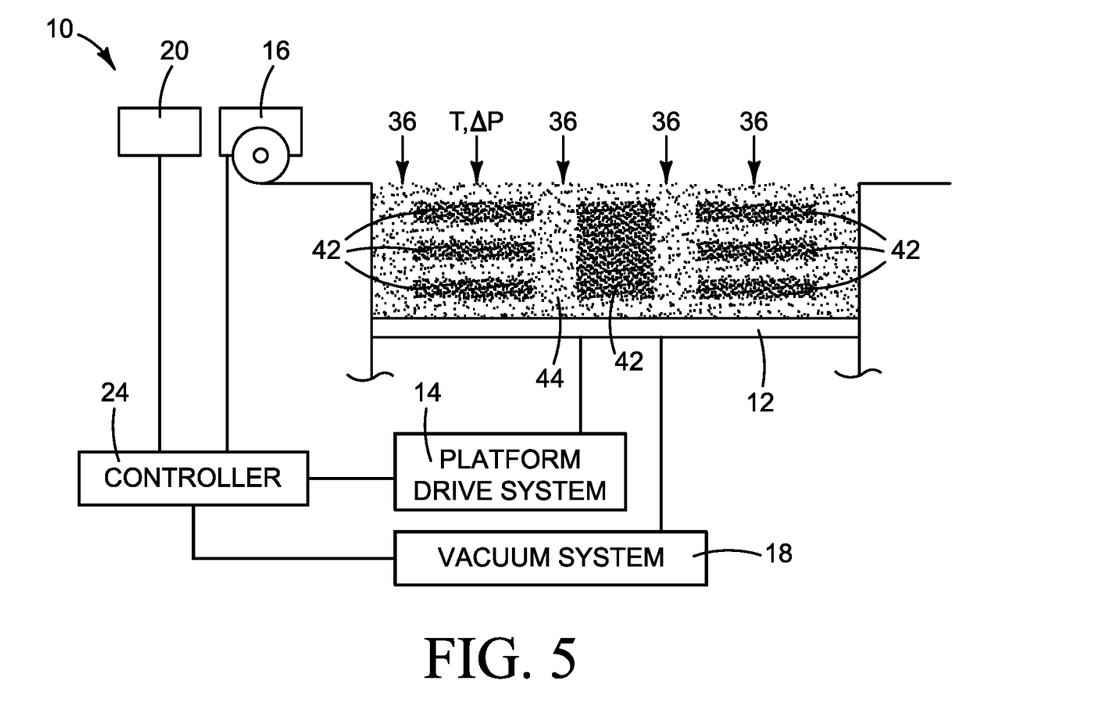

In FIG. 4, roller 16 is spreading a second layer 38 and applicator 20 is applying a functional agent 40 selectively on to build material in layer 38 in a pattern corresponding to a digital slice of the object being printed. Vacuum system 18 continues to pull air through the build material while applying agent 40. The process of layering build material powder and applying functional agent is repeated for multiple successive layers. FIG. 5 shows a group of printed objects 42 before removal from the powder bed 44. Objects 42 in FIG. 5 represent green parts, fused objects or other printed structures.

Only a few layers of build material are shown in the figures and the thickness of each layer is greatly exaggerated to better illustrate the examples shown and described. Hundreds or thousands of very thin layers of build material are commonly used in 3D printing to form the printed structures.

The degree of compression of the build material will vary depending on the rate of air flow. The rate of air flow is a function of build material thickness T and pressure difference ΔP across thickness T, and may be influenced by the characteristics of the build material and the functional agent, as well as the size and shape of objects 42 and the number and position of objects 42 in powder bed 44. It may be desirable in some 3D printing processes to maintain a uniform rate of air flow through the build material within a build area of platform 12 even as the thickness T of the build material increases and objects 42 take form within the powder bed. Air flow around the regions treated with functional agent and around the printed structures may influence the pressure difference ΔP to maintain uniform air flow through the powder bed over the full extent of the build area. Accordingly, a larger pressure difference ΔP may be applied to some regions of the powder bed compared to other regions by dividing platform 12 into vacuum zones.

Figure 6:
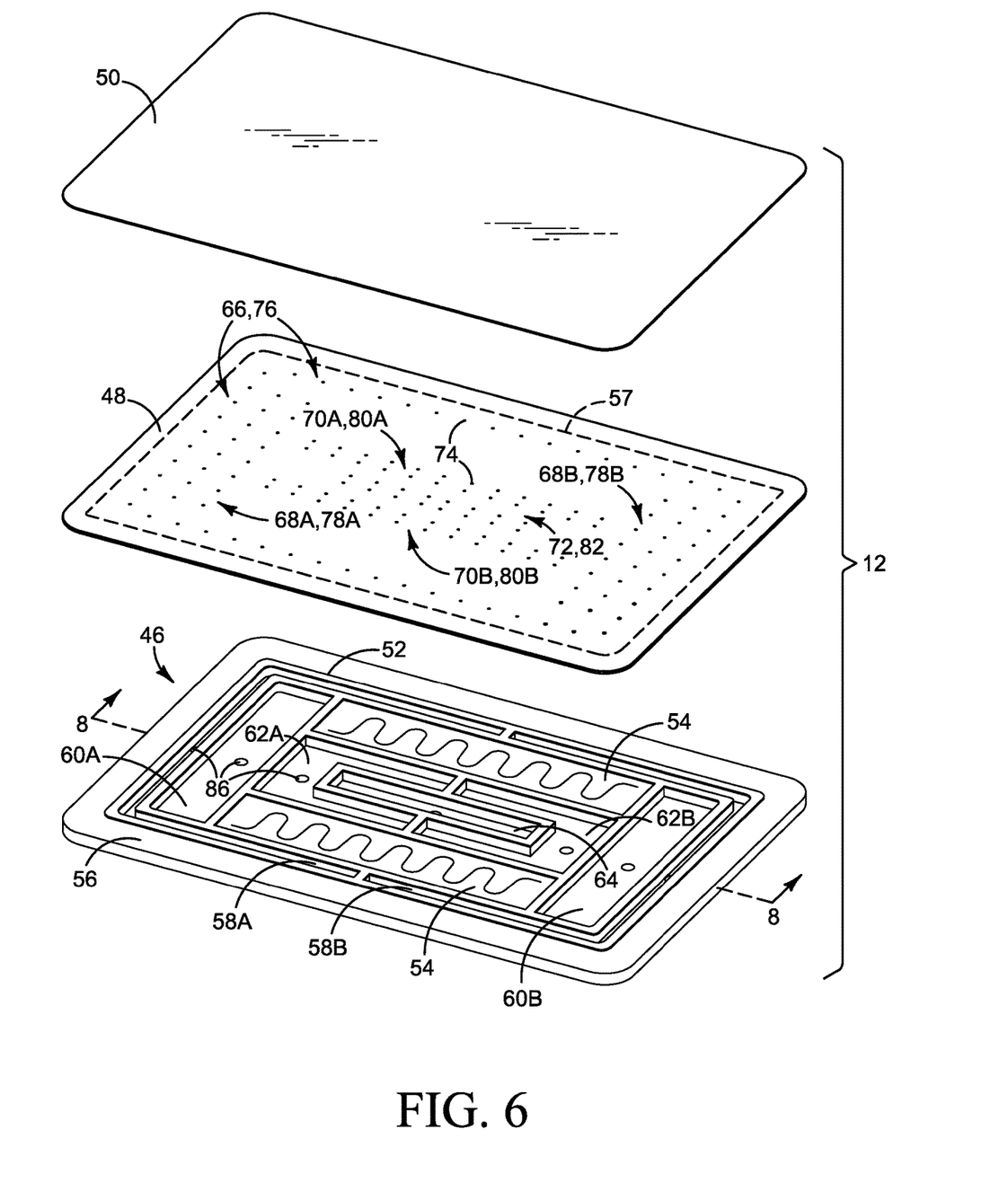
FIG. 6 is a partial exploded view of the platform.
Figure 7:
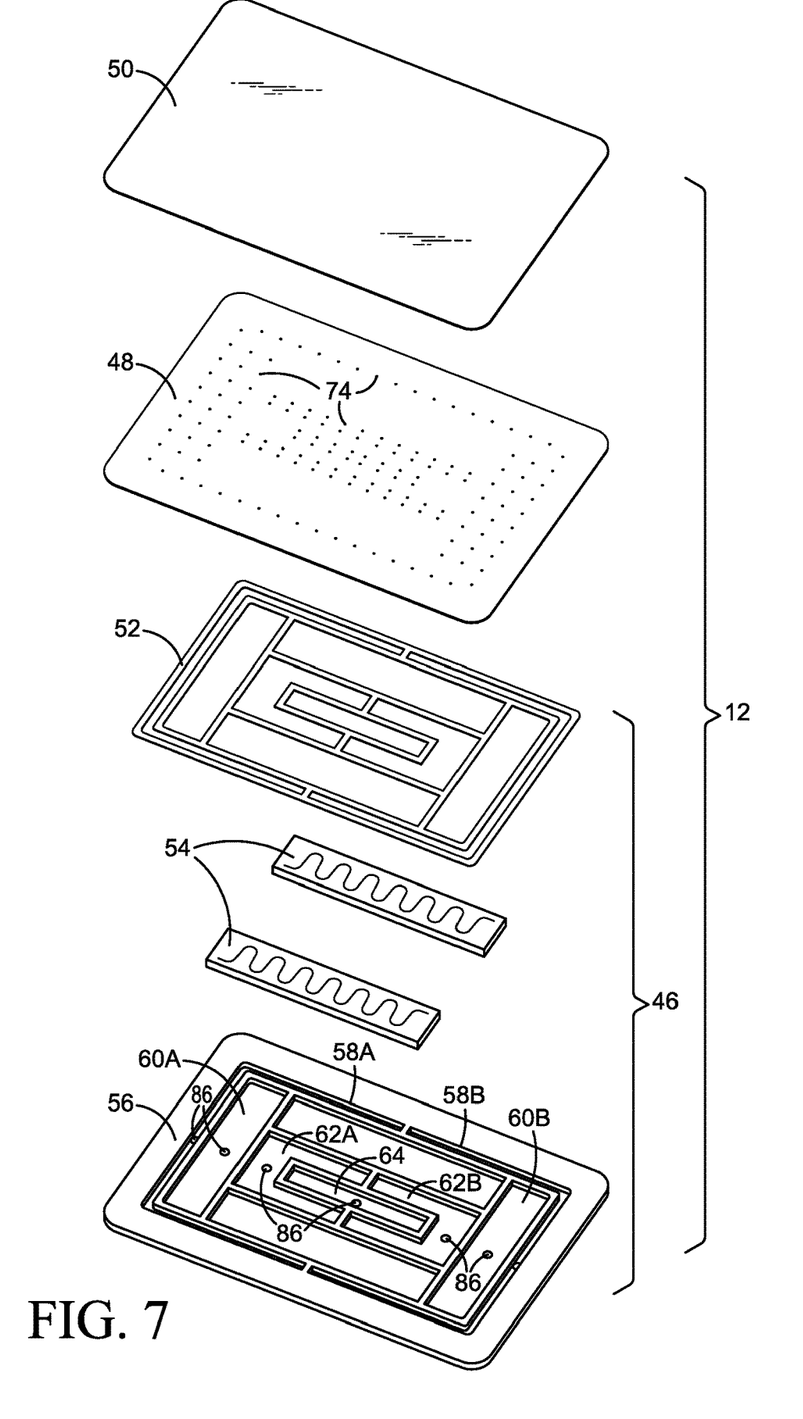
FIG. 7 is a fully exploded view of the platform.
Figure 8:
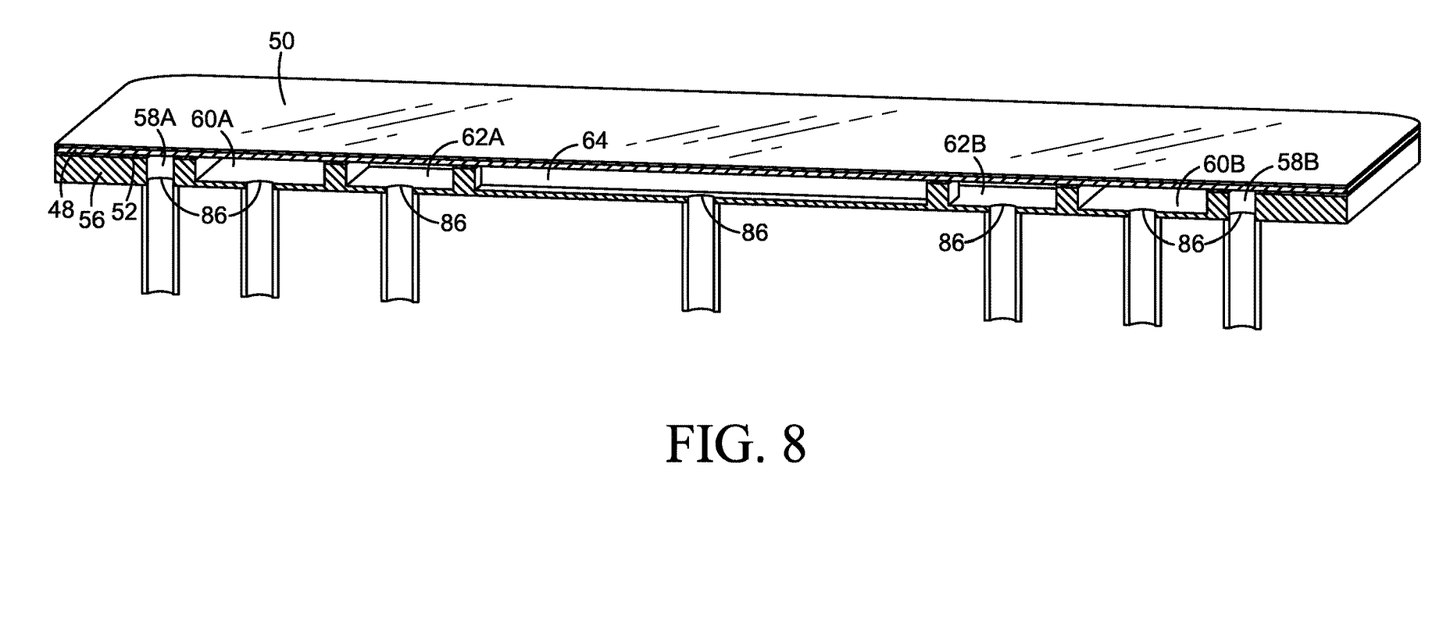
FIG. 8 is a section view taken along the line 8-8 in FIG. 6.
Figure 9:
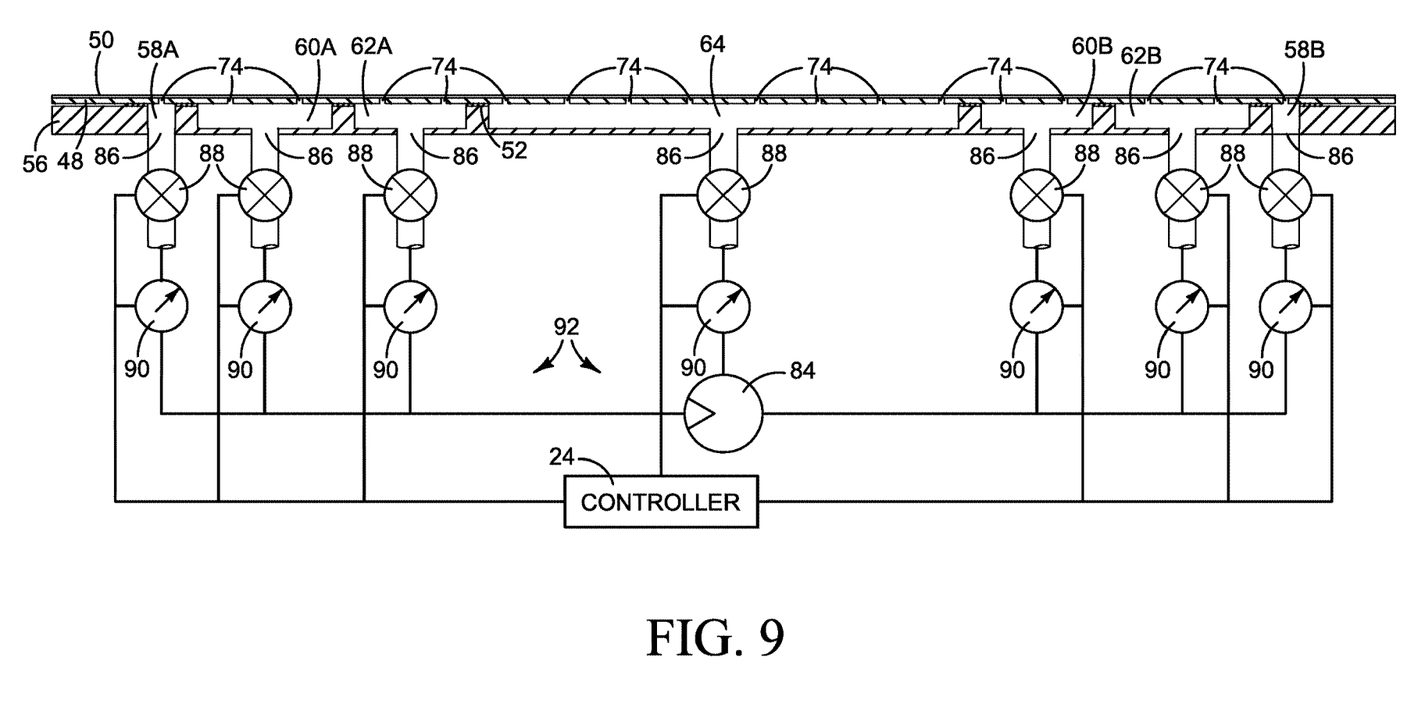
FIG. 9 is a section view showing flow control for the platform.

FIGS. 6-9 illustrate one example of a build platform 12 with multiple vacuum zones to apply vacuum selectively during the printing process, and at varying intensities to help maintain uniform air flow and thus uniform compression across the powder bed as the thickness of the build material increases, agent is applied, and objects are formed. FIG. 6 is a partial exploded view of platform 12. FIG. 7 is a fully exploded view of platform 12. FIG. 8 is a section view taken along the line 8-8 in FIG. 6. FIG. 9 is a section view showing flow control for platform 12. Referring to FIGS. 6-9, platform 12 includes a vacuum chamber assembly 46, a vacuum plate 48 on assembly 46, and a powder filter 50 on plate 48. In this example, chamber assembly 46 includes a seal 52, heaters 54 and a chamber plate 56. Objects are usually printed within a build area smaller than the full extent of the build platform to avoid possibly unstable or inconsistent conditions along the edges of the platform. A build area 57 is shown in dashed lines near the perimeter of plate 48 in FIG. 6.

Chamber plate 56 includes multiple chambers 58A, 58B, 60A, 60B, 62A, 62B, and 64 to supply vacuum to corresponding groups 66, 68A, 68B, 70A, 70B, and 72 of holes 74 in plate 48. Filter 50 is impermeable to the powdered build material and permeable to the air (or other gas) sucked through the powder, to protect against powder entering the vacuum system. In this example, the vacuum chambers and holes are positioned within build area 57. Chambers 58A, 58B supply vacuum to hole group 66 along a perimeter vacuum zone 76. Chambers 60A, 60B supply vacuum to hole groups 68A, 68B in first interior vacuum zones 78A, 78B. Chambers 62A, 62B supply vacuum to hole groups 70A, 70B in second interior vacuum zones 80A, 80B. Chamber 64 supplies vacuum to hole group 72 in a central interior vacuum zone 82.

As best seen in FIGS. 8 and 9, each chamber 58A, 58B, 60A, 60B, 62A, 62B, and 64 is operatively connected to a vacuum pump 84 through an opening 86 at the bottom of plate 56, a valve 88, and a flow meter 90. Pump 84, valves 88, and flow meters 90 form a vacuum control system 92 operating at the direction of a controller 24 executing vacuum control instructions 28 (FIG. 1) to selectively apply vacuum to build material on platform 12 in zones 76, 78A, 78B, 80A, 80B, and 82 at different times during the printing process, and at varying intensities, for example to help maintain uniform flow across the full extent of build area 57 even as the thickness of the build material increases during printing. In the example system 92 shown in FIG. 9, vacuum is controlled by opening and closing valves 88 partly or fully to achieve the desired location and intensity of vacuum applied to build material on platform 12. Feedback from flow meters 90 enables controller 24 to maintain the desired vacuum over zones 76, 78A, 78B, 80A, 80B, and 82.

Although the number and configuration of vacuum zones may vary depending on the size, shape and placement of printed objects, concentric zones such as zones 76, 78A, 78B, 80A, 80B, and 82 in FIGS. 6-9 may be desirable for 3D printers and printing processes in which the printed objects are likely to obstruct air flow more in the middle of the build area and less at the perimeter of the build area. For example, as structures are printed vacuum may be reduced first and faster along a narrow perimeter zone 76 where air flow is not obstructed during printing, followed by a reduction at first interior zones 78A, 78B with a corresponding increase in vacuum at second interior zones 80A, 80B and central zone 82. Heating elements 54 may be used in platform 12 to simultaneously warm and compress the build material through a thermally conductive plate 48, for example to maintain the desired temperature for printing green parts and subsequently raising the temperature to cure the green parts in situ. Other suitable zonal configurations for platform 12 are possible, with and without heating elements. More or fewer zones and with different shapes and arrangements may be used depending on such factors as the size, number and position of printed structures as well as the air flow characteristics of the build material itself.

Figure 10:
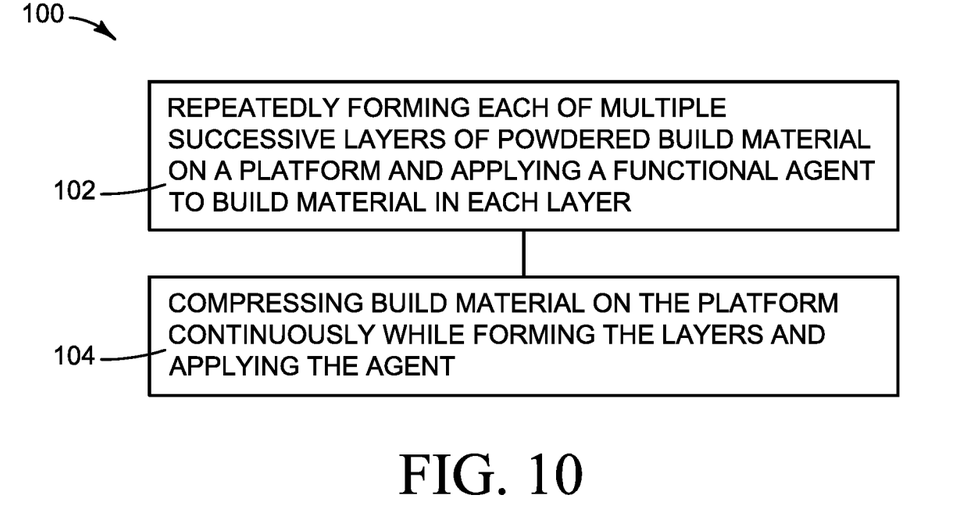
FIGS. 10 and 11 are flow diagrams illustrating example 3D printing processes with build material powder compression.

FIG. 10 is a flow diagram illustrating one example of a 3D printing process 100. Process 100 may be implemented, for example, by a printer 10 in FIGS. 1 and 2 with a controller 24 executing vacuum control instructions 28. Referring to FIG. 10, process 100 includes repeatedly forming each of multiple successive layers of powdered build material on a platform and applying a functional agent on to build material in each layer (block 102) and compressing build material on the platform continuously while forming the layers and applying the agent (block 104). The build material may be compressed at block 104 by applying a vacuum continuously to some or all of the build material on the platform while forming the layers and applying the agent. The vacuum may be applied selectively through multiple zones at different times during the printing process, and at varying intensities to help maintain uniform compression across the full extent of the build material even as the thickness of the build material increases.

Figure 11:
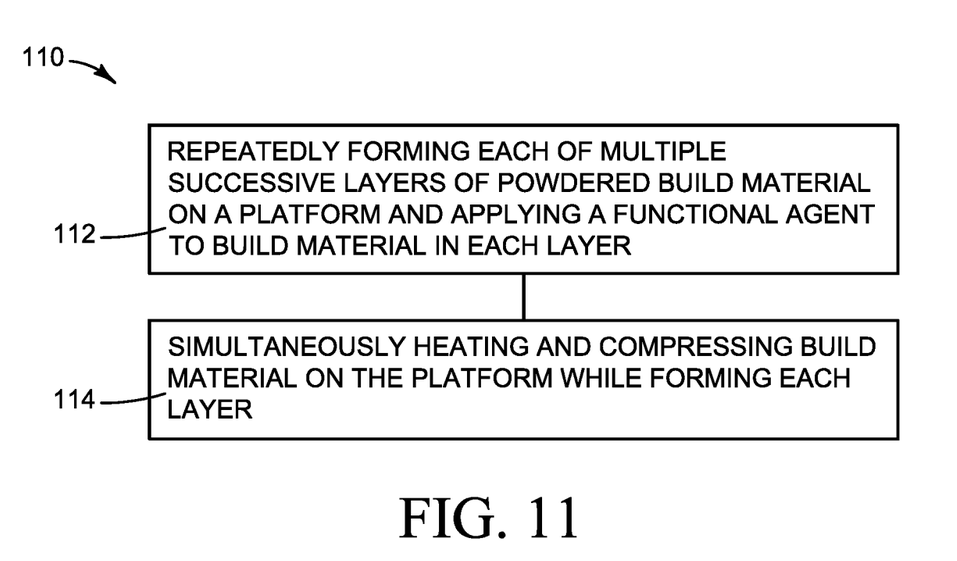

FIG. 11 illustrates another example of a 3D printing process 110. Process 110 may be implemented, for example, by a printer 10 in FIGS. 1 and 2 with a controller 24 executing vacuum control instructions 28. Referring to FIG.

11, process 110 includes repeatedly forming each of multiple successive layers of powdered build material on a platform and applying a functional agent on to build material in each layer (block 112) and simultaneously heating and compressing build material on the platform while forming each layer (block 114). The build material may be compressed at block 114 by applying a vacuum to build material on the platform while forming each layer. The vacuum may be applied intermittently, for example, turning off the vacuum while agent is applied, or continuously while forming the layers and applying the agent. The vacuum may be applied selectively through multiple zones at different times during the printing process, and at varying intensities to help maintain uniform compression across the full extent of the build material even as the thickness of the build material increases.

As noted at the beginning of this Description, the examples shown in the figures and described above illustrate but do not limit the scope of the patent. Other examples are possible. Therefore, the foregoing description should not be construed to limit the scope of the patent, which is defined in the following Claims.

"A" and "an" as used in the Claims means one or more.

The invention claimed is:

1. A platform system for a powder-based 3D printer, comprising:
   a first vacuum chamber;
   a second vacuum chamber;
   a vacuum control system to apply a vacuum selectively to at least one of the first vacuum chamber and the second vacuum chamber;
   a plate covering the first vacuum chamber and the second vacuum chamber to support a powdered build material during printing, the plate having a first hole therein operatively connected to the first vacuum chamber and a second hole therein operatively connected to the second vacuum chamber; and
   a filter covering the plate, the filter permeable to air and impermeable to the powdered build material.

2. The platform system of claim 1, wherein the vacuum control system further comprises:
   a first valve configured to regulate a first air flow rate to the first vacuum chamber; and
   a second valve configured to regulate a second air flow rate to the second vacuum chamber.

3. The platform system of claim 2, wherein the vacuum control system further comprises:
   a first flow meter configured to determine the first air flow rate; and
   a second flow meter configured to determine the second air flow rate.

4. The platform system of claim 3, further comprising a controller configured to operate at least one of the first valve, the second valve, and a vacuum pump in response to at least one of (a) data received from the first flow meter regarding the first air flow rate and (b) data received from the second flow meter regarding the second air flow rate.

5. The platform system of claim 1, wherein the plate comprises:
   a first plurality of holes operatively connected to the firs vacuum chamber, wherein the first plurality of holes comprises the first hole; and
   a second plurality of holes operatively connected to the second vacuum chamber, wherein the second plurality of holes comprises the second hole.

6. The platform system of claim 1, wherein the plate is a thermally conductive plate and the platform system comprises a heating element under the plate.

7. The platform system of claim 6, wherein the heating element comprises multiple heating elements.

8. The platform system of claim 4, wherein the plate comprises:
   a first plurality of holes operatively connected to the first vacuum chamber, wherein the first plurality of holes comprises the first hole, and wherein the first plurality of holes is located along a perimeter of the plate; and
   a second plurality of holes operatively connected to the second vacuum chamber, wherein the second plurality of holes comprises the second hole, and wherein the second plurality of holes is located in an interior portion of the plate.

9. The platform system of claim 8, wherein the controller is configured to, during a printing job of the powder-based 3D printer, at least partially close the first valve and at least partially open the second valve.

10. The platform system of claim 8, wherein the controller is configured to operate the first valve and the second valve such that the first air flow rate is equal to the second air flow rate.

11. The platform system of claim 5, wherein the first plurality of holes is located along a perimeter of the plate.

12. The platform system of claim 5, wherein the first plurality of holes is located along a perimeter of the plate, and wherein the second plurality of holes is located in an interior portion of the plate.

* * * * *